(12) United States Patent
Modarresi (10) Patent No.: US 10,810,616 B2
(45) Date of Patent: Oct. 20, 2020

(54) PERSONALIZATION OF DIGITAL CONTENT RECOMMENDATIONS

(71) Applicant: Adobe Inc., San Jose, CA (US)

(72) Inventor: Kourosh Modarresi, Los Altos, CA (US)

(73) Assignee: Adobe Inc., San Jose, CA (US)

( * ) Notice: Subject to any disclaimer, the term of this patent is extended or adjusted under 35 U.S.C. 154(b) by 660 days.

(21) Appl. No.: 15/239,162

(22) Filed: Aug. 17, 2016

(65) Prior Publication Data

US 2018/0053210 A1   Feb. 22, 2018

(51) Int. Cl.
*G06Q 30/02* (2012.01)
*G06N 20/00* (2019.01)
*G06F 16/9535* (2019.01)
*G06F 16/2457* (2019.01)
*G06F 16/9035* (2019.01)

(52) U.S. Cl.
CPC ... *G06Q 30/0251* (2013.01); *G06F 16/24578* (2019.01); *G06F 16/9035* (2019.01); *G06F 16/9535* (2019.01); *G06N 20/00* (2019.01)

(58) Field of Classification Search
USPC ............................. 705/14.51, 26.7; 706/45
See application file for complete search history.

(56) References Cited

U.S. PATENT DOCUMENTS 6,266,649 B1 * 7/2001 Linden ............ G06Q 10/08345
  705/14.51
8,117,085 B1 * 2/2012 Smith ................ G06Q 30/0629
  705/26.7
2008/0189232 A1 * 8/2008 Dunning ................ G06N 20/00
  706/45

OTHER PUBLICATIONS

"Matrix Computations", 4th Ed., Computer Assisted Mechanics and Engineering Sciences, Johns Hopkins University Press, US, 2013, 780 pages.
Adomavicius,"Toward the Next Generation of Recommender Systems: A Survey of the State-of-the-Art and Possible Extensions", IEEE Transactions on Knowledge and Data Engineering, vol. 17, No. 6, Jun. 2005, pp. 734-749.
Amatriain,"Recommender Systems", MLSS 14—Retrieved at: http://www.slideshare.net/xamat/recommender-systems-machine-learning-summer-school-2014-cmu, Jul. 2014, 248 pages.
Candes,"Exact Matrix Completion via Convex Optimization", Found. of Comput. Math., May 2008, 49 pages.

(Continued)

*Primary Examiner* — Afaf Osman Bilal Ahmed
(74) *Attorney, Agent, or Firm* — SBMC (57) ABSTRACT

Personalization techniques for digital content recommendations are described. In one example, a hybrid model is used to form recommendations for individual users, groups of individual users, and so on. The hybrid model may also employ a latent factor model, which is configured to employ an implicit similarity approach to recommendations. The recommendations formed by these models are then used to generate a third, final, recommendation. As part of this, a weighting may be employed to weight a contribution of recommendations from the collaborative filter model and latent factor model in order to further personalize a recommendation for a user. Moreover, through application of localized regularization, for which every user is treated separately and also every content is considered independently, more personalization is achieved.

20 Claims, 6 Drawing Sheets

(56) References Cited

OTHER PUBLICATIONS

Candes,"Matrix Completion with Noise", Proceedings of the IEEE 98(6), Mar. 18, 2009, 11 pages.
Leskovec,"Mining of Massive Datasets", Mar. 2014, 513 pages.
Linden,"Amazon.com Recommendations: Item-to-item collaborative filtering", Internet Computing, IEEE, 7(1), 76-80., 2003, pp. 76-80.
Lu,"Recommender Systems", Feb. 7, 2012, 97 pages.
Modarresi,"Computation of Recommender System Using Localized Regularization", Procedia Computer Science, vol. 51, Jun. 2015, pp. 2407-2416.

* cited by examiner

502
Receive data describing interaction and conversion of respective ones of a plurality of users with digital marketing content;

504
Generate personalized recommendations for the respective ones of the plurality of users from the data, the personalized recommendations formed through use of a combination of a collaborative filtering model and a latent factor model

506
Control distribution of subsequent digital marketing content to respective ones of a plurality of users based on the personalized recommendations

PERSONALIZATION OF DIGITAL CONTENT RECOMMENDATIONS

BACKGROUND

Recommendations are used to connect users with digital content of interest, such as digital content that describes a potentially desirable good or service, songs, webpages, movies, and so forth. In one example, digital content is configured as digital marketing content, e.g., advertisements. Advertisements are provided to users in order to increase a likelihood that a user will interact with the digital marketing content or another item of digital marketing content toward purchase of a product or service, which is also referred to as conversion.

A user, for instance, may navigate through webpages of a website of a service provider system through use of a respective computing device, e.g., mobile phone, desktop computer, and so forth. During this navigation, the user is exposed to advertisements relating to the good or service via the respective computing device. If the advertisements are of interest to the user, the user may select the advertisement via the computing device to navigate to webpages that contain more information about the product or service that is a subject of the advertisement, functionality usable to purchase the good or service, and so forth. Each of these selections thus involves conversion of interaction of the user via the respective computing device with respective digital marketing content into other interactions with other digital marketing content and/or even purchase of the good or service. Thus, configuration of the advertisements in a manner that is likely to be of interest to the users increases the likelihood of conversion of the users regarding the good or service.

In another example of digital marketing content and conversion, users may agree to receive emails or other electronic messages relating to goods or services provided by the service provider system. The user, for instance, may opt-in to receive emails of marketing campaigns corresponding to a particular brand of product or service. Likewise, success in conversion of the users towards the product or service that is a subject of the emails directly depends on interaction of the users with the emails. Since this interaction is closely tied to a level of interest the user has with the emails, configuration of the emails also increases the likelihood of conversion of the users regarding the good or service.

However, conventional techniques that are used by a computing device to form recommendations are typically inefficient and ineffective. For conversion in the previous example, actual conversion rates are typically in the single digits, i.e., less than ten percent. This is caused by use of models by the computing device as part of conventional techniques that are incapable of addressing individual users and thus are not personalized.

SUMMARY

Personalization techniques for digital content recommendations are described. In one example, a hybrid model is used by a computing device to form recommendations for individual users, groups of individual users, and so on. The hybrid model includes a collaborative filter model, which is a content-based similarity model. Through use of a collaborative filter model by the computing device, a rating (e.g., conversion rate) of a user on unrated digital content (e.g., with which the user has not interacted) may be determined in a variety of ways by the computing device. In a first example, this rating is based on similar items of digital content that have been rated by the user. In a second example, this rating is based on similarity of users, one to another, for the same digital content.

The hybrid model may also employ a latent factor model, which is configured to employ an implicit similarity approach to recommendations when employed by a computing device. In this technique, explicit profiles (e.g., features) of users and items of digital content are not required by the computing device and instead are computed implicitly (i.e., indirectly) for the computation of similarities between users and/or between items of digital content. Other models may also be employed by the computing device, such as a baseline model.

The recommendations formed by these models are then used by the computing device to generate a third, final, recommendation. As part of this, a weighting may be employed by the computing device to weight a contribution of recommendations from the collaborative filter model and latent factor model in order to further personalize a recommendation for a user. In this way, different contributions of the models towards the final recommendation may be personalized for the user by the computing device, thereby improving accuracy of the recommendation as well as subsequent techniques that rely on the recommendation. This may include control of dissemination of advertisements to a respective computing device of the user to increase a conversion rate to purchase or interact with goods or services.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Recommendations have become one of the primary techniques by which users locate digital content of interest through interaction with a respective computing device, even surpassing use of search for some types of digital content. Recommendations may be configured as movie recommendations, related product recommendations, web page recommendations, social recommendations, priority inbox and spam filtering, online data, computational advertising, online source offerings, and so forth.

In a digital marketing content example, computing devices of marketing service systems employ a variety of insights about activities of existing and potential consumers in order to understand the performance of digital marketing content provided to consumers. In this way, the marketing service systems may control provision of subsequent items of digital marketing content to increase a likelihood that the digital marketing content is of interest to these consumers. However, conventional techniques used by a computing device to form recommendations typically exhibit limited effectiveness, oftentimes due to a lack of personalization of the recommendations.

Techniques and systems are described to personalize digital content recommendations by a computing device. In one example, a hybrid model is used by a computing device to form recommendations for individual users, groups of individual users, and so on that have increased personalization over conventional techniques. The hybrid model employs a collaborative filter model and a latent factor model. These models are trained by the computing device using data that describes interaction of users with digital content and a rating which describes a result of these interactions, e.g., conversion rate.

The collaborative filter model is a content-based similarity model. Through use of a collaborative filter model, a rating (e.g., conversion rate) of a user on unrated digital content (e.g., with which the user has not interacted) may be determined by the computing device in a variety of ways. In a first example, this rating is based on similar items of digital that have been rated by the user. The similarity of the items, for instance, may be determined through use of explicit features of the respective items of digital content, e.g., actors, ratings, director.

In a second example, this rating is based on similarity of users, one to another, for the same items of digital content, e.g., demographics, similar content experiences, and so on. Weights may be employed as part of this determination by the computing device such that higher degrees of similarity lead to higher weights. In this way, a collaborative filter model may be used by the computing device as a basis to recommend digital content based on similarities to other users or similarities to digital content, with which, the user has interacted. For example, values associated with the items of digital content (e.g., conversion rates) may be used to recommend other items of digital content based on similarity of that digital content to other digital content that is liked by the user or similarity of that user to other users.

The latent factor model is configured to employ an implicit similarity approach to recommendations. In this technique, explicit profiles (e.g., features) of users and items of digital content are not required by the computing device and instead are computed implicitly (i.e., indirectly) for the computation of similarities between users and/or between items of digital content. A rating (e.g., conversion rate) for an item of digital content with which the user has not interacted is determined by the computing device using both user-based and content-based approaches as above. In the content based approach, a weighted aggregation (e.g., weighted averaging) is used by the computing device for items of digital content, with which, the user has interacted, e.g., has a rating. These ratings are then used to compute the rating for the digital content with which the user has not interacted. In the user-based approach, a weighted aggregation (e.g., weighted averaging) is also used by the computing device for other users that are similar and for which rating are available for respective items of digital content. Thus, in this example the latent factor model is configured by the computing device to compute and use digital content and user features implicitly independent of collection of explicit features.

The hybrid model in the techniques and system described herein is configured to employ recommendations from both the collaborative filter model and latent factor model in order to generate a third, final, recommendation by the computing device. As part of this, a weighting may be employed by the computing device to weight a contribution of recommendations from the collaborative filter model and latent factor model in order to further personalize a recommendation for a user. For instance, an initial weighting may be employed to arrive at an initial recommendation based on a combination of results (i.e., recommendations) from these two models. This initial recommendation (e.g., user/item correlations with respective conversion rates) is then compared by the computing device to a training recommendation generated from both the models using training data. This comparison is used to adjust the initial weighting, and this process is repeated by the computing device until convergence of the initial recommendations with the training recommendations. In this way, different contributions of the models to the recommendation may be personalized for the user, thereby improving accuracy of the recommendation as well as subsequent techniques that rely on the recommendation, e.g., to control which advertisements are exposed to the user by the computing device to increase a conversion rate to purchase or interact with goods or services. Other models may also be incorporated as part of this techniques by the computing device, an example of which is a baseline model. Further discussion of these and other examples is included in the following.

An example environment is first described that may employ the recommendation techniques described herein. Example procedures are then described which may be performed in the example environment as well as other environments. Consequently, performance of the example procedures is not limited to the example environment and the example environment is not limited to performance of the example procedures.

Key Terms

The term "digital content" refers to any content that may be stored digitally or electronically, e.g., movies, books, documents, games, applications, images, audio files, and so on. An example of digital content is "digital marketing content," which refers to content provided to users related to marketing activities performed, such as to increase awareness of and conversion of products or services made available by a service provider, e.g., via a website. Accordingly, digital marketing content may take a variety of forms, such as emails, advertisements included in webpages, webpages themselves, and so forth. Ratings refer to an action that results from this interaction, such as on conversion, which can be, opening of emails, clicking on links within emails, purchasing, and so forth.

The term "conversion" refers to performing an action responsive to exposure to a campaign. Examples of conversions are clicking a link, navigating to a website, purchase of a product or service, and so on.

The term "recommendation" is a suggestion or proposal regarding an item of digital content. Examples of recommendations include suggestions of related digital movies, books, descriptions of physical products or services, descriptions of computer applications, and so forth.

Example Environment

Figure 1:
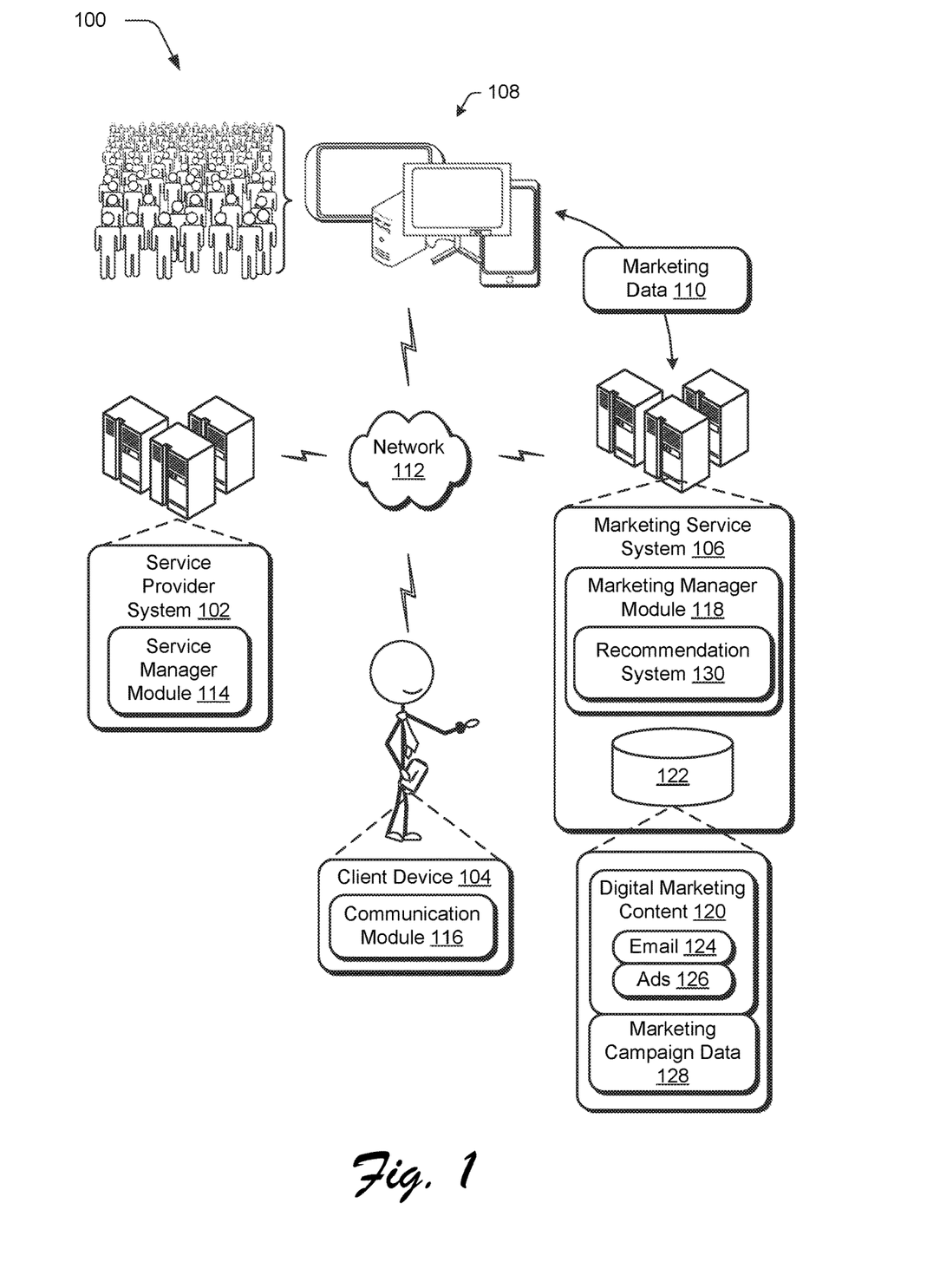
FIG. 1 is an illustration of an environment in an example implementation that is operable to employ recommendation techniques described herein.

FIG. 1 is an illustration of an environment 100 in an example implementation that is operable to employ recommendation techniques described herein. The illustrated environment 100 includes a service provider system 102, client device 104, marketing service system 106, and source system 108 of marketing data 110 that are communicatively coupled, one to another, via a network 112.

These entities are implemented by computing devices that are configured in a variety of ways. A computing device. for instance, may include a processing system having one or more processors and devices (e.g., CPUs, GPUs, microcontrollers, hardware elements, fixed logic devices, etc.), and one or more computer-readable storage media. Thus, the various modules 114, 116, 118, and system 130 along with the storage 122, are implemented at least partially in hardware of respective computing devices (e.g., servers, personal computers) and may reside on the computer-readable storage media to be executed by the processing system. Examples of processing systems and computer-readable media can be found in the discussion of the example computing system of FIG. 6.

The processing system of the service provider system 102, for instance, may retrieve and execute computer-program instructions from the service manager module 114 to provide a wide range of functionality, including but not limited to online application stores, document management web services, online storage, web services, digital content providers (e.g., movies, books, images), social networks, and so forth.

The source system 108 of marketing data 110 is illustrated as involving interaction of users with respective items of digital marketing content 120 through use of respective computing devices. In this example, recommendations of digital marketing content are used as one example of digital content that may be the subject of a recommendation using the techniques described herein. Other examples are also contemplated, such as movie recommendations, related product recommendations, web page recommendations, social recommendations, priority inbox and spam filtering, online data, computational advertising, online source offerings, and so forth.

Computing devices that are usable to implement the service provider system 102, client device 104, marketing service system 106, and source system 108 may be configured in a variety of ways. A computing device, for instance, may be configured as a desktop computer, a laptop computer, a mobile device (e.g., assuming a handheld configuration such as a tablet or mobile phone as illustrated), and so forth. Thus, the computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as further described in relation to FIG. 6.

The service provider 102 is illustrated as including a service manager module 114 that is representative of functionality of a computing device to provide services accessible via a network 112 that are usable to make products or services available to consumers. The service manager module 114, for instance, may expose a website or other functionality that is accessible via the network 112 by a communication module 116 of the client device 104. The communication module 116, for instance, may be configured as a browser, network-enabled application, and so on that obtains data from the service provider system 102 via the network 112. This data is employed by the communication module 116 to enable a user of the client device 104 to communicate with the service provider system 102 to obtain information about the products or services as well as purchase the products or services.

In order to promote the products or services, the service provider system 102 may employ a marketing service system 106. Although functionality of the marketing service system 106 is illustrated as separate from the service provider system 102, this functionality may also be incorporated as part of the service provider 102, further divided among other entities, and so forth. The marketing service system 106 includes a marketing manager module 118 that is representative of functionality implemented by at least one computing device to provide digital marketing content 120 for consumption by users, which is illustrated as stored in storage 122, in an attempt to convert products or services of the service provider system 102.

The digital marketing content 120 may assume a variety of forms, such as email 124, advertisements 126, and so forth. The digital marketing content 120, for instance, may be provided as part of a marketing campaign data 128 to the source system 108 of the marketing data 110. Marketing data 110 may then be generated based on the provision of the digital marketing content 120 to describe which users received which items of digital marketing content 120 (e.g., from particular marketing campaigns) as well characteristics of the users. From this marketing data 110, the marketing manager module 118 may control which items of digital marketing content 120 (e.g., advertisements) are provided to a subsequent user, e.g., a user of client device 104, in order to increase a likelihood that the digital marketing content 120 (e.g., advertisements) is of interest to the subsequent user.

Part of the functionality usable to control provision of the digital marketing content 120 is represented as a recommendation system 130. The recommendation system 130 is implemented using at least one computing device to generate recommendations that are usable to control which items of digital marketing content 120 are provided to respective computing devices of individual users, users as part of a defined segment (e.g., collection of users having similar demographics and/or user interactions), and so forth. In the techniques described herein, personalization of recommendations by the recommendation system 130 is supported, and as such may increase accuracy of techniques that rely on these recommendations. An example showing operation of the recommendation system 130 to train models that are then used to form a personalized recommendation is described in the following.

Figure 2:
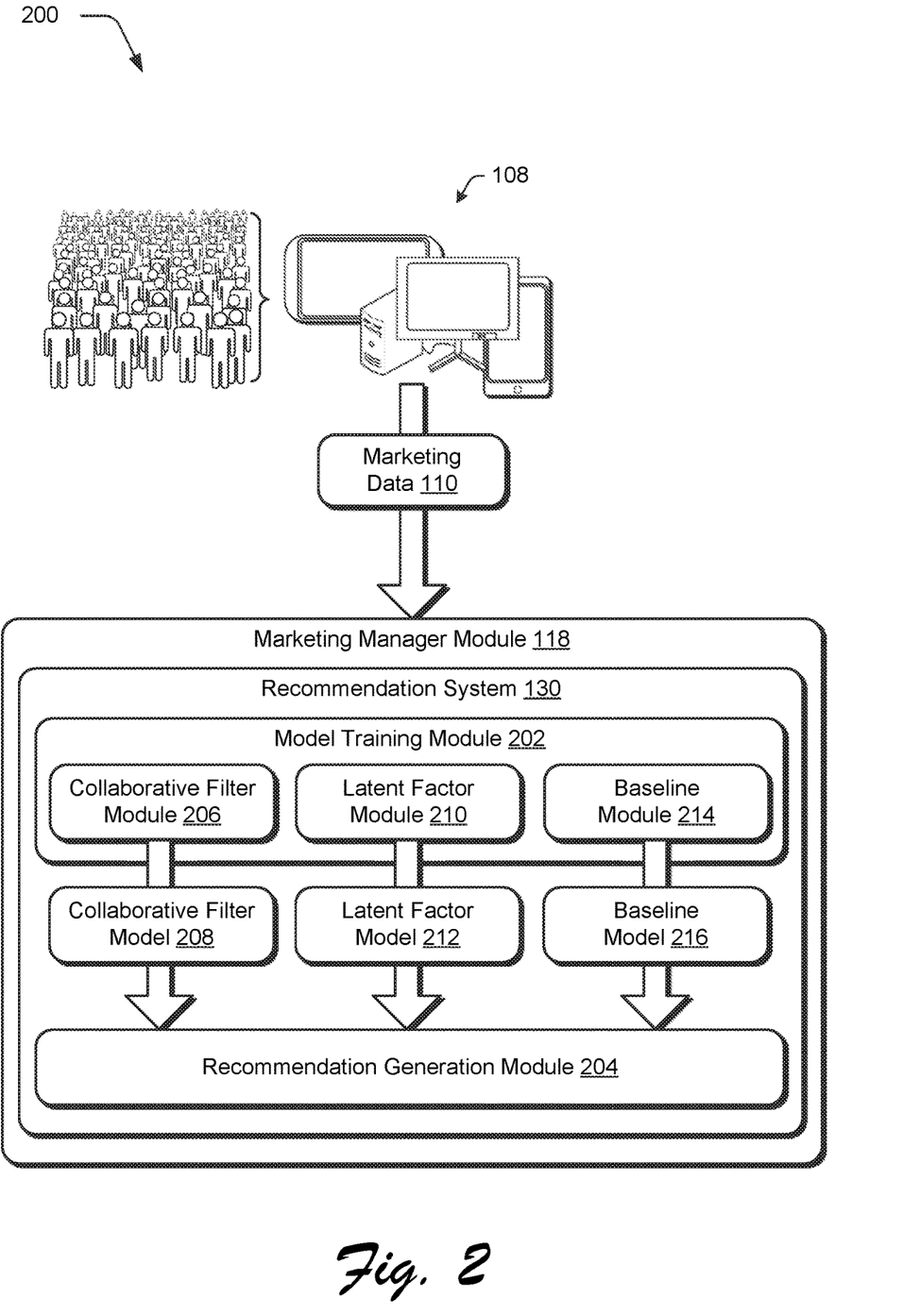
FIG. 2 depicts a system in an example implementation in which a recommendation system of FIG. 1 is shown in greater detail as configured to train models used to form a recommendation.

FIG. 2 depicts a system 200 in an example implementation in which operation of the recommendation system 128 is shown in greater detail as configured to train models used to form a recommendation. The recommendation system 130 is illustrated as including a model training module 202 and a recommendation generation module 204. The model training module 202 is implemented at least partially in hardware of a computing device to generate models that are used by a recommendation generation module 204 to generate recommendations, e.g., for individual users.

Examples of this functionality include a collaborative filter module 206 that is implemented at least partially in hardware to generate a collaborative filter module 208. Another example includes a latent factor module 210 that is implemented at least partially in hardware to generate a latent factor model 212. Other examples of models usable to form recommendations are also contemplated, an illustrated example of which includes a baseline module 214 implemented at least partially in hardware to generate a baseline module 216.

The collaborative filter module 206 is implemented by a computing device to generate the collaborative filter model 208 to make use of collaborative filtering in order to form a recommendation. Collaborative filtering is used by the computing device to generate the recommendation based on interests of a user by first collecting data, an example of which is illustrated as marketing data 110, that describes source 108 of the marketing data 110. In this case, the marketing data 110 describes interaction of users of the source 108 with respective items of digital marketing content 120 (e.g., through use of respective computing devices) and actions resulting from those interactions, e.g., a rating such as conversion as described above.

From this, the collaborative filtering model is used by the computing device to generate a recommendation based on similarity of users and/or similarity of items of digital content to each other. The collaborative filtering model 208, for instance, may employ a matrix formed from the marketing data 110 in which users and items of digital content form each axis (i.e., rows and columns) with entries in the matrix specifying the rating for the respective item of digital content that is associated with the respective users. In general, entries included in the matrix may be explicit such as opinions or the actions, rating or total purchases, or may be implicit such as the amount of time spent on a web site, how much time is spent searching an item/movie, and so forth. The data may include historic (logged) data, live (streaming) data, or a combination of the two. From this, the collaborative filter model 208 is able to determine similarity of users and/or items and from this recommend items of digital content 120 that have a likelihood of achieving a desired result, e.g., conversion or other user action.

The latent factor module 210 is configured to generate the latent factor model 212. The latent factor model 212 is configured to find underlying latent factors that may be used as a basis to explain interactions, e.g., user interactions with digital content and whether these interactions resulted in conversions. Since these underlying factors are typically not observed and even in some instances are not directly observable, these are called latent factors. For instance, the matrix described above may be factorized into a product of matrices. This may be performed using a variety of techniques, such as through use of singular value decompositions (SVD) as further described below. This product of matrices represents latent factors that are usable to determine similarity of users and/or digital content and form recommendations based on this similarity as described above.

A variety of other models are also usable to generate recommendations. An example of this is illustrated as the baseline module 214, which is configured to generate the baseline model 216. The baseline model 216, for instance, is configured to determine an unknown rating of a user regarding a respective item of digital content, which may be computed based on an average rating the user gives to all digital content rated by the user, an average rating an item of digital content has received, and an average of all ratings of all users in relation to all digital marketing content. An example of such a rating is conversion rates regarding digital marketing content, with which, the user has interacted although other ratings are also contemplated as also described above.

The collaborative filter model 208, latent factor model 212, and baseline model 216 are trained from the marketing data 110 (i.e., training data). These models 208, 212, 216 are then provided to the recommendation generation module 204 to form personalized recommendations for individual users, segments of users, and so on as further described in the following.

Figure 3:
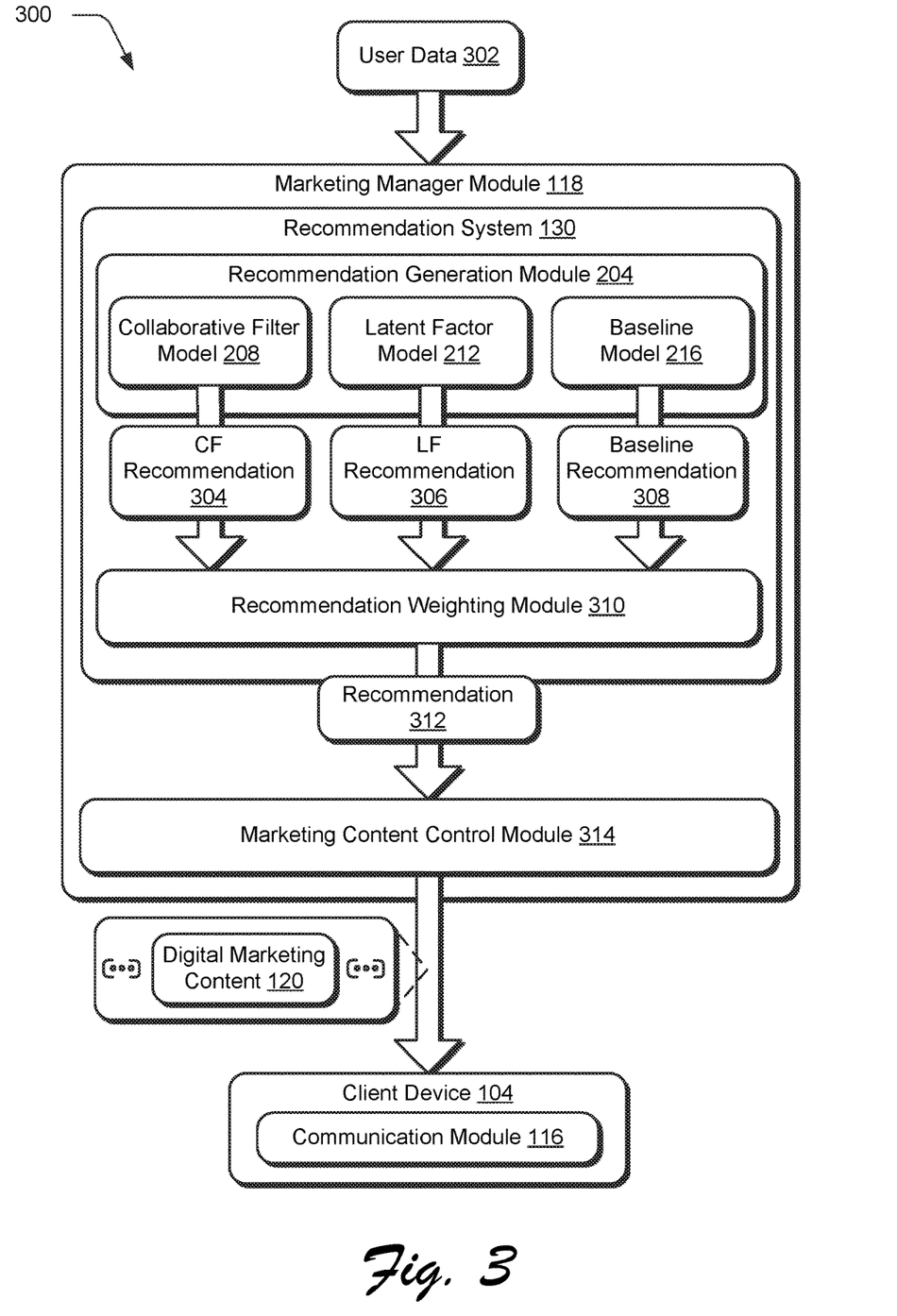
FIG. 3 depicts an example system in which the recommendation system is shown in greater detail as generating a recommendation using the models trained in FIG. 2.

FIG. 3 depicts an example system 300 in which the recommendation system 130 is shown in greater detail as generating a recommendation using the models of FIG. 2. User data 302 is received by the recommendation system 130 that describe interaction of the user (or segment of users) with respective items of digital content. This user data 302 is then employed by the recommendation generation module 204 along with digital marketing data in order to form recommendations based on ratings of respective items in order to achieve a desired action, e.g., conversion.

A first example of this is illustrated as a collaborative filter model 208. The collaborative filter model 208 is an example of a similarity-based recommendation technique that employs computation of an unknown user rating or propensity (unknown entry in the matrix X) using some of the known entries or rating in the matrix. There are two types of similarity-based recommendation systems, content-to-content and user-to-user similarity-based recommendations.

Data employed by the models to generate a recommendation may be represented in the form of a matrix, which is referred to as matrix "X" in the following. Rows of the matrix represent users (i) and columns represent digital content or other items (j) in this example. Each matrix entry—$x_{ij}$—includes the rating of user "i" on item "j." Thus each entry ($x_{ij}$) describes a relationship between a specific items of digital content "j" and a specific user "i."

In the content-based similarity model, a rating of a user in relation to an unrated item of digital content ($x_{ij}$) may be determined through examination of items of digital content that are similar to the item of digital content "j" in question that have been rated by the same user, i.e., user "i." These similarities may be determined in a variety of ways, such as through use of explicit features of the digital content. A weighted average may then be employed for each of the similar items of digital content to determine the unknown rating, "$x_{ij}$." From these ratings, a recommendation is generated, such as to control dissemination of digital marketing content that has the greatest likelihood of result in conversion (i.e., has the highest conversion rate) to the user.

In the user (demographic) based similarity recommendation, the collaborative filter model 208 uses the available rating of all other similar users (similar to user "i") on the same content "j." The final rating of the user "i" (illustrated as CF recommendation 304) on content "j, $x_{ij}$," is computed as a weighted average of the ratings of all similar users on the same content "j." These weights correspond to the degree of similarities so higher similarities lead to higher weights.

In the explicit similarity-based recommendation models, the similarities are computed using explicit features of content or users. For example, in the case of a user-movie recommendation, the movie features include a director, length, actors and actresses, and studio. The explicit features for the user may include a user's age, user's income, user's address, user's marital status, and so forth.

Collection of explicit user and digital content features, however, can be nontrivial and expensive. In addition, analysis based on explicit features may be biased and lack accuracy because the explicit features may be noisy, sparse and highly correlated.

Accordingly, implicit features may be used that are not directly observable. Typically, implicit features are not observed directly. This may be due to an inability to observe these features or due to the high cost of their observation and measurement. Implicit features may be used to explain the available user experience data (such as movie rating, purchasing patterns, so on) effectively due in part to an ability to define complicated and unknown data characteristics that are difficult to be measured or observed explicitly.

In the implicit similarity approach for recommendations as employed by the latent factor model 212, explicit features of users and digital content interactions are computed implicitly (indirectly) to be used for the computation of similarities between users and between items of digital content. In these techniques (also referred to as neighborhood based techniques) there are two approaches, user based and content based, to find a rating for an item that has not been exposed to a user. In the content-based approach, digital content for which a rating is available for the user is used to ascertain a weighted aggregation (e.g., weighted averaging) of each of these ratings to compute a rating for an unknown item of digital content, i.e., the user has not had previous interactions with that item. The weights are computed based on the similarities between the digital content of the user for which ratings are available with digital content having unknown weightings. Higher weights are used for digital content having a higher degree of similarity, one to another.

The similarity of the digital content may be computed in a variety of ways, such as through use of content vectors. Each of the entries in a content vector are based on rating associated by different users with respect to that item of digital content in a content-based approach. Alternatively, in a user-based approach, the similarities of other users who have rated the content, with which the user has not interacted, are compared. A weighted average of each of these other users' ratings is used to compute the unknown rating for the user regarding the item of digital content, with which, the user has not interacted. In the latent factor model 212, both of these approaches are used simultaneously.

The latent factor model 212 computes and uses digital content and user features implicitly, and therefore explicit features are not collected. The past activities/interactions are used to deduce similarities among users (user-to-user) and items of digital content (item-to-item similarities). Hence, the similarities are based on the actions (rating, like, how many visits user had on a site, etc.) and not based on explicit user features (age, income) or content features (book's author, price, content, title). In other words, to compute the similarity of two users, interactions (e.g., rating) are compared regarding a same item of digital content. If the rankings (on all items of digital content) are similar, then the users are similar There are a variety of techniques that may be employed by the latent factor model 212 to form a latent factor recommendation 306, e.g., ratings for unknown items of digital content. An example of this is singular value decomposition (SVD). SVD uses the ratings of each of the users that are available (e.g., with which the user has interacted) to implicitly discover item and user features. These discovered features are not limited to explicit features, e.g., age, income, address, and so on. Rather, the implicit features may define a non-linear/linear combination of features and may not represent any physical or explicit interpretation.

Singular value decomposition is defined for every "m×n" matrix X as:

$$X=UDV^t$$

where: U, the left singular vectors, is "m×n" orthogonal matrix, $$UU^t=U^tU=1$$

V, the right singular vectors, is "n×n" orthogonal matrix $$VV^t=V^tV=1$$

and D=diag ($d_1$, $d_2$, . . . , $d_n$) with the singular vectors;

$$d_1 \geq d_2 \geq \ldots \geq d_n \geq 0$$

SVD may be computed using minimum reconstruction error as follows:

$$\min\|X - U_q D_q V_q\|$$

which is equivalent to $$\operatorname*{argmin}_{(u,v,d)} \|X - Xvu^t\|_2^2$$

or $$\min_{U,D,V} \sum [x_{ij} - u_i d_i v_j^T]^2$$

However, the matrix X includes missing entries that cannot be part of this computation. Accordingly, the available entries of X may be used as follows:

$$\operatorname*{argmin}_{U,D,V} \sum_{i,j \in N(i,j)} [x_{ij} - u_i d_i v_j^T]^2$$

where "N(i,j)" is the set of all "i" and "j" where the corresponding entries in "X" are not missing.

A baseline model 216 may also be employed by the recommendation generation module 204 to generate a baseline recommendation 308, e.g., to compute unknown entries in the matrix "X" which may then be ranked to determine which items of digital content are likely to achieve a desired result such as conversion. The baseline model 216, for instance, may be configured to generate an unknown rating of user "i" on digital content "j, $x_{ij}$," based on the average rating associated with the user "i" to all digital content with which the user has interacted, an average rating digital content "j" has received and an average of all ratings, e.g., by all users on all of the items of digital content.

Baseline estimate for $x_{ij}$, for instance, may be computed as follows:

$$b_{ij}=v+t_i+t_j$$

where
  v=mean rating of all users over all items;
  $t_i$=rating bias of user i=mean of all ratings by user i−v; and
  $t_j$=rating bias of item j=mean of all ratings on item j−v.

The unknown rating ($x_{ij}$) is then computed using a weighted mean of the baseline scores as follows:

$$x_{ij} = x_{ij}^{es} = b_{ij} + \Sigma_{j \in S(i,j)}^{n,p} \alpha_{ij} * (x_{ij} - b_{ij})$$

where, "S(i,j)" includes each of the items having a rating for user "i" that are similar to item "j" in the sense of some similarity measure such as k-Nearest Neighbors (k-NN) technique or a threshold of correlation between those items and item "j."

The value of "$\alpha_{ij}$" is estimated by minimizing the Root Mean Square error (RMSE), $$RMSE = \frac{1}{M} \left( \sum_{i,j} (x_{ij} - x_{ij}^{es})^2 \right)^{\frac{1}{2}}$$

where M is the number of available (non-zero) entries in matrix X. Minimization of RMSE leads to the following:

$$\min_{\alpha_{ij}} \frac{1}{M} \left( \sum_{i,j \in N(i,j)} \left( x_{ij} - \left( b_{ij} + \sum_{j \in S(i,j)}^{n,p} \alpha_{ij} * (x_{ij} - b_{ij}) \right) \right)^2 \right)^{\frac{1}{2}}$$

Since M is a constant, this is equivalent to the following:

$$\min_{\alpha_{ij}} \left( \sum_{i,j \in N(i,j)} \left( x_{ij} - \left( b_{ij} + \sum_{j \in S(i,j)} \alpha_{ij} * (x_{ij} - b_{ij}) \right) \right)^2 \right)^{\frac{1}{2}}$$

To simplify this equation further, MSE may be used instead of RSME as follows:

$$\min_{\alpha_{ij}} \sum_{i,j \in N(i,j)} \left[ x_{ij} - \left( b_{ij} + \sum_{j \in S(i,j)} \alpha_{ij} * (x_{ij} - b_{ij}) \right) \right]^2$$

And substituting for "$b_{ij}$," the following is obtained:

$$\min_{\alpha_{ij}} \sum_{i,j \in N(i,j)} \left[ x_{ij} - \left( v + t_i + t_j + \sum_{j \in S(i,j)} \alpha_{ij} * (x_{ij} - b_{ij}) \right) \right]^2$$

Regularization is applied to prevent overfitting. Thus, $$\min_{\alpha_{ij}} \left\{ \sum_{i,j \in N(i,j)} \left[ x_{ij} - \left( v + t_i + t_j + \sum_{j \in S(i,j)} \alpha_{ij} * (x_{ij} - b_{ij}) \right) \right]^2 + \gamma \left( \sum_{i \in N(i,j)} t_i^2 + \sum_{j \in N(i,j)} t_j^2 \right) \right\}$$

for "$\gamma$" to be the regularization parameter.

However, this is a global regularization that ignores specific characteristics of users and items of digital content and treats both items of digital content and users as having the same features. Accordingly, the following may be used to consider regularization of items of digital content and users separately from each other:

$$\min_{\alpha_{ij}} \left\{ \sum_{i,j \in N(i,j)} \left[ x_{ij} - v + t_i + t_j + \sum_{j \in S(i,j)} \alpha_{ij} * (x_{ij} - b_{ij}) \right]^2 + \left( \sum_{i \in N(i,j)} \gamma_1 t_i^2 + \sum_{j \in N(i,j)} \gamma_2 t_j^2 \right) \right\}$$

In this way, features of users and items of digital content are recognized as two different variables that are separately penalized or regularized.

Adaptive personalization is employed to achieve full personalization such that each user is considered as a unique individual and also each item as a unique item, which is expressed as follows:

$$\min_{\alpha_{ij}} \left\{ \sum_{i,j \in N(i,j)} \left[ x_{ij} - v + t_i + t_j + \sum_{j \in S(i,j)} \alpha_{ij} * (x_{ij} - b_{ij}) \right]^2 + \left( \sum_{i \in N(i,j)} \gamma_i t_i^2 + \sum_{j \in N(i,j)} \gamma_j t_j^2 \right) \right\}$$

The latent factor model 212 is a generalization and extension of collaborative filtering. The latent factor model 212 is used to find the underlying (latent) factors that explain interactions of users with digital content. Singular value decomposition as described above is one technique that is usable as part of the latent factor model 212 to form the latent factor recommendation 306.

SVD matrix factorization models rely on the correlations among users (e.g., user habits such as rating, ranking, liking, purchasing) and also correlation between items of digital content (e.g., similar patterns such as movie genre, movie's length, director). Though, unlike explicit similarity-based models, the latent factor model 212 may be implemented without explicit user or digital content features and discovers the underpinning variables (latent factors) that explain those similarities.

The latent factor model 212 is typically configured as an ill-posed (i.e., ill-conditioned) problem and thus there is not enough information to directly solve it. From the point of view of linear systems of equations, this may be considered as (practically) an underdetermined system where the number of constraints (e.g., equations or rows in the matrix representation of data) is less than the degree of freedom of the system (e.g., variables or columns) and therefore an infinite number of solutions are available. Accordingly, constraints are added in the form of regularization to penalize overfitting to solve this problem.

For example, to compute unknown data entries in the data matrix "X," an inverse version of SVD is used. In this way, using the known (non-missing) entries, the right hand side of the SVD decomposition may be found, i.e., the singular vectors and singular values. Then, using the right hand side, the missing entries are computed by reconstructing the original matrix. By renaming the right hand side as follows:

$$R = U \text{ and } Q^T = DV^T$$

and using the component of the matrices:

$$x_{ij} = r_i * q_j^T = \Sigma_{p=1}^{k} r_{ip} * q_{pj}$$

The best reconstruction matrix is computed for the matrix X as follows:

$$\min_{R,Q} \sum_{i,j,j \in N(i,j)}^{n,p} (x_{ij} - r_i * q_j^T)^2$$

In order to prevent overfitting, regularization is added as follows:

$$\min_{R,Q} \sum_{i,j}^{n,p} (x_{ij} - r_i * q_j^T)^2 + \lambda \left( \sum_{i=1}^{n} \|r_i\|^2 + \sum_{j=1}^{n} \|q_j\|^2 \right)$$

This approach of regularization suggests that the users and items of digital content have the same characteristics and thus should be penalized similarly. To treat the users and items of digital content distinctively (i.e., independently), the following is performed:

$$\min_{R,Q} \sum_{i,j,j \in N(i,j)j}^{n,p} (x_{ij} - r_i * q_j^T)^2 + \left( \sum_{i=1}^{n} \lambda_1 \|r_i\|^2 + \lambda_2 \sum_{j=1}^{n} \|q_j\|^2 \right)$$

However, this assumes that each of the users have the same features and thus the same regularization is applied to each of them. To personalize the recommendation system 130, localized regularization is employed in which users and items of digital content are separately addressed, an expression of which is as follows:

$$\min_{R,Q} \sum_{i,j,j \in N(i,j)j}^{n,p} (x_{ij} - r_i * q_j^T)^2 + \left( \sum_{i=1}^{n} \lambda_i \|r_i\|^2 + \lambda_{2j} \sum_{j=1}^{n} \|q_j\|^2 \right)$$

An assumption may be made that the missing data is missing completely at random. This means that the probability that a data point is missing does not depend on its observed value. The assumption of "concentration of the measure" may also be used, which means the information in the data is concentrated in a lower dimensional space or the rank of the data matrix is "k" which is relatively small in comparison to "min (m, n)." This supports use of SVD as a solution for a low rank approximation problem, which is also referred to as a matrix approximation lemma.

Also, with respect to the sparseness of the data matrix, an assumption may be made that;

$$a \geq C \, n^{1.2} r \log n$$

where "r=rank(X)" and "a=number of available entries in X," for a positive numerical constant "C." Under these circumstances, the missing entries in the data matrix may be accurately recovered.

The latent factor model 212 is domain-neutral and LF recommendation 306 (e.g., the rating) may pertain to a variety of types of digital content such as movies, books, websites, and so forth. In computing or recovering the unknown entries of the matrix, overfitting may happen due to the lack of sufficient information. Thus, regularization is implemented as a form of penalization of the objective function above. The latent factor model 212 is based on a different view of regularization, i.e., a localized regularization technique which leads to improvement in the estimation of the missing values.

Recommendations formed by the recommendation generation module 204 are then provided to a recommendation weighting module 310 to arrive at a resulting (e.g., "final") recommendation 312. The recommendation weighting module 310 is implemented at least partially in hardware to weight a contribution of recommendations 304, 306, 308 obtained from respective models in forming the recommendation 312.

For example, the latent factor model 212 may perform better to generalize a complete structure of the data, while similarity-based techniques of the collaborative filter model 208 may perform better to address data that is dominated by a small group of highly correlated data points. Accordingly, the recommendation weighting module 310 may employ a plurality of models as a hybrid to address this realization that no single model is equally effective in every instance. In the illustrated example, a collaborative filter recommendation 304, latent factor recommendation 306, and baseline recommendation 308 are used as a basis to form the recommendation 312 that is used to control dissemination of digital marketing content 120 by a marketing content control module 314 to a user that corresponds to the user data 302.

As part of this, localized regularization is applied to achieve fully personalized recommendations. Continuing with the previous example, similarity based collaborative filter and latent factor approaches may be combined as follows:

$$x_{ij} = b_{ij} + *r_i * q_j^T$$

And may further be combined with the baseline model 216:

$$x_{ij} = v + t_i + t_j + r_i * q_j^T$$

This results in the following hybrid model:

$$\min_{R,Q,\alpha_{ij}} \left\{ \sum_{i,j \in N(i,j)} \left[ x_{ij} - \left( b_{ij} + r_i * q_j^T + \sum_{j \in S(i,j)} \alpha_{ij} * (x_{ij} - b_{ij}) \right) \right]^2 + \left( \sum_{i \in N(i,j)} \gamma_i t_i^2 + \sum_{j \in N(i,j)} \gamma_j t_j^2 \right) + \left( \sum_{i=1}^{n} \lambda_i \|r_i\|^2 + \lambda_j \sum_{j=1}^{n} \|q_j\|^2 \right) \right\}$$

Implementation of this hybrid model is based on stochastic gradient descent (SGD), where all of the variables are fixed except the one variable that is to be optimized. This process is iteratively performed for each variable until each of the variables converge.

As part of this hybrid model, a weighting is ascertained by the recommendation weighting module 310 to define an amount of contribution of each of the recommendations from the models in arriving at the final recommendation 312. This weighting is personalized for the user data 302 and may be applied individually to users and items of digital content, respectively.

For example, the recommendation weighting module 310 may begin by estimating an initial recommendation 312 based on a combination of results (i.e., recommendations) from the recommendation generation module 204. This may include the CF recommendation 304, LF recommendation 306, and/or the baseline recommendation 308. This initial recommendation 312 is based on an initial weighting, e.g., predefined by a user, previously calculated, and so forth. The initial recommendation 312 is then compared to a training recommendation that is based on a combination of previous results, e.g., from the collaborative filtering model and the latent factor model for training data. The training data, for instance, may use the marketing data 110 to arrive at the entries within a matrix for user/item combinations, e.g., conversion rates. The initial recommendation 312 (e.g., initial values estimated for unknowns) are then compared with these training values, and used to adjust the weighting in an attempt to have these values converge with respective iterations. In this way, the weighting may be personalized per user.

In an implementation example, these techniques were applied to two data sets, having 10000×20 dimensions. The first data matrix contained the conversion of different marketing campaigns 128 and the second data set contained movie ratings, e.g., on a scale of one to five. The results of the application of the hybrid model were then compared with those of a similarity based and latent factor based model that were applied to this data, alone. The average improvement in the accuracy (RSME) of the recommendations was observed as 16.4% and 12.8%, respectively. Thus, these recommendations may provide significant improvements to other techniques that rely on these recommendations, such as to select digital marketing content 120 for dissemination. A variety of other examples are also contemplated as further described in the following section.

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-3.

Figure 4:
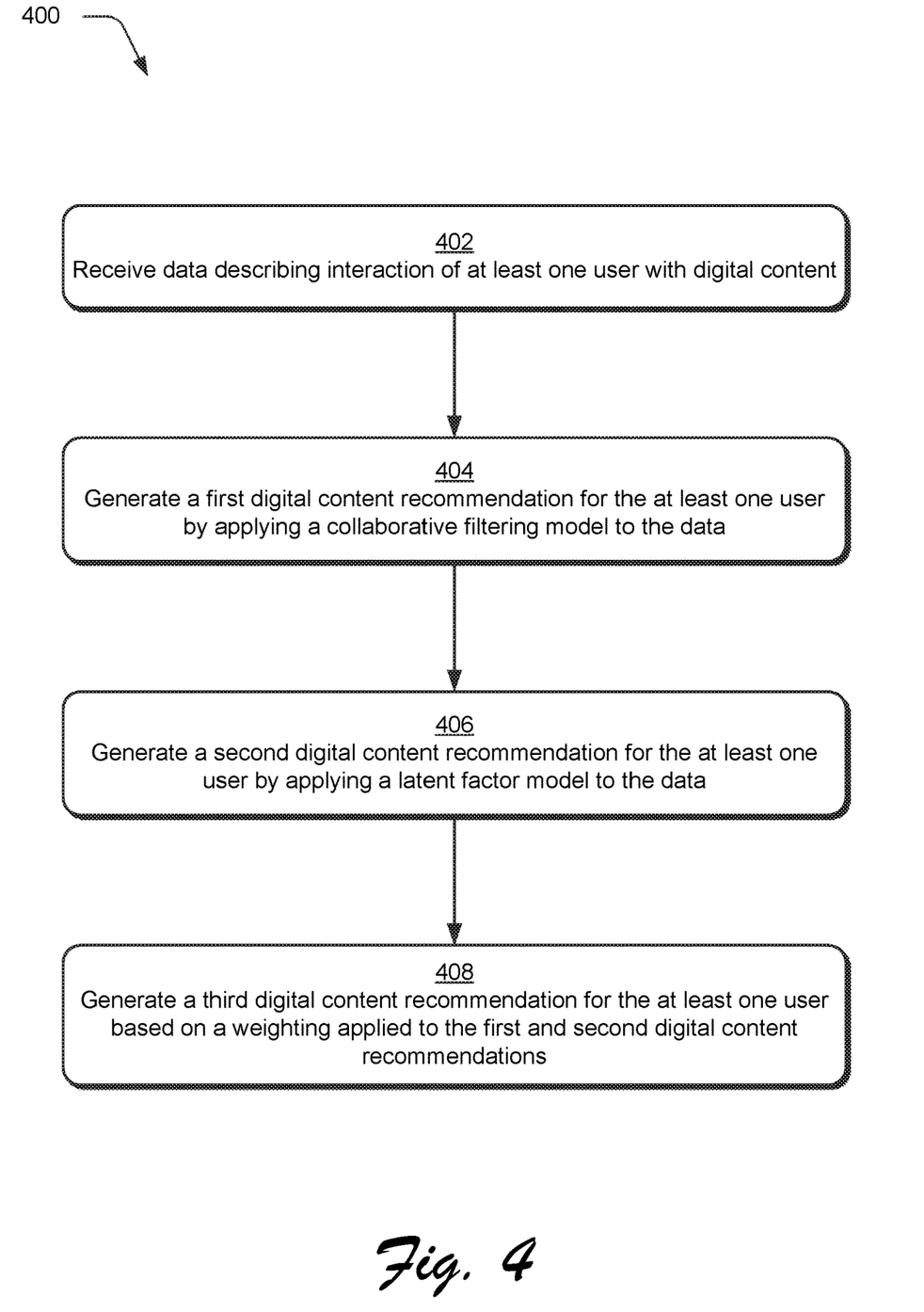
FIG. 4 is a flow diagram depicting a procedure in an example implementation in which a digital content recommendation is generated using collaborative filter model and a latent factor model along with a weighting to define a contribution of these models.

FIG. 4 depicts a procedure 400 in an example implementation in which a digital content recommendation is generated using collaborative filter model and a latent factor model along with a weighting to define a contribution of these models. Data is received that describes interaction of at least one user with digital content (block 402). The data, for instance, may describe interaction of the users with emails, webpages, advertisements, social media communications, and so forth.

A first digital content recommendation is generated for the at least one user by applying a collaborative filtering model to the data (block 404). The first digital content recommendation, for instance, may be generated through use of a collaborative filter module 208 to employ a similarity based technique as a collaborative filter recommendation 304. The collaborative filter recommendation 304 may include values for items of digital content, for which, a rank (e.g., conversion rate) is unknown, i.e., the user has not interacted with these items.

A second digital content recommendation is generated for the at least one user by applying a latent factor model to the data (block 406). The second digital content recommendation may be generated through use of a latent factor model 212 to employ a latent factor based technique to generate a latent factor recommendation 306. Other examples are also contemplated, such as to generate a baseline recommendation 308 using a baseline model 216.

A third digital content recommendation is generated for the at least one user based on a weighting applied to the first and second digital content recommendations (block 408). Continuing with the previous example, a recommendation weighting module 310 may be used to generate a recommendation 312 from the recommendations from the models.

As part of this, a weighting is applied to weight a contribution of recommendations from respective models in the generation of the recommendation 312. This weighting may be calculated in a variety of ways.

In one instance, an initial weighting is employed to arrive at an initial recommendation based on a combination of recommendations from the models. This initial recommendation (e.g., user/item correlations with respective conversion rates) is then compared to a training recommendation generated from both the models using training data, e.g., data used to initially train the models or other collections of data that are used to implement and update the models at a later point in time. This comparison is used to adjust the initial weighting, and this process is repeated until convergence of the initial recommendations with the training recommendations. In this way, different contributions of the models to the recommendation may be personalized for the user, thereby improving accuracy of the recommendation as well as subsequent techniques that rely on the recommendation, e.g., to control which advertisements are exposed to the user to increase a conversion rate to purchase or interact with goods or services.

Figure 5:
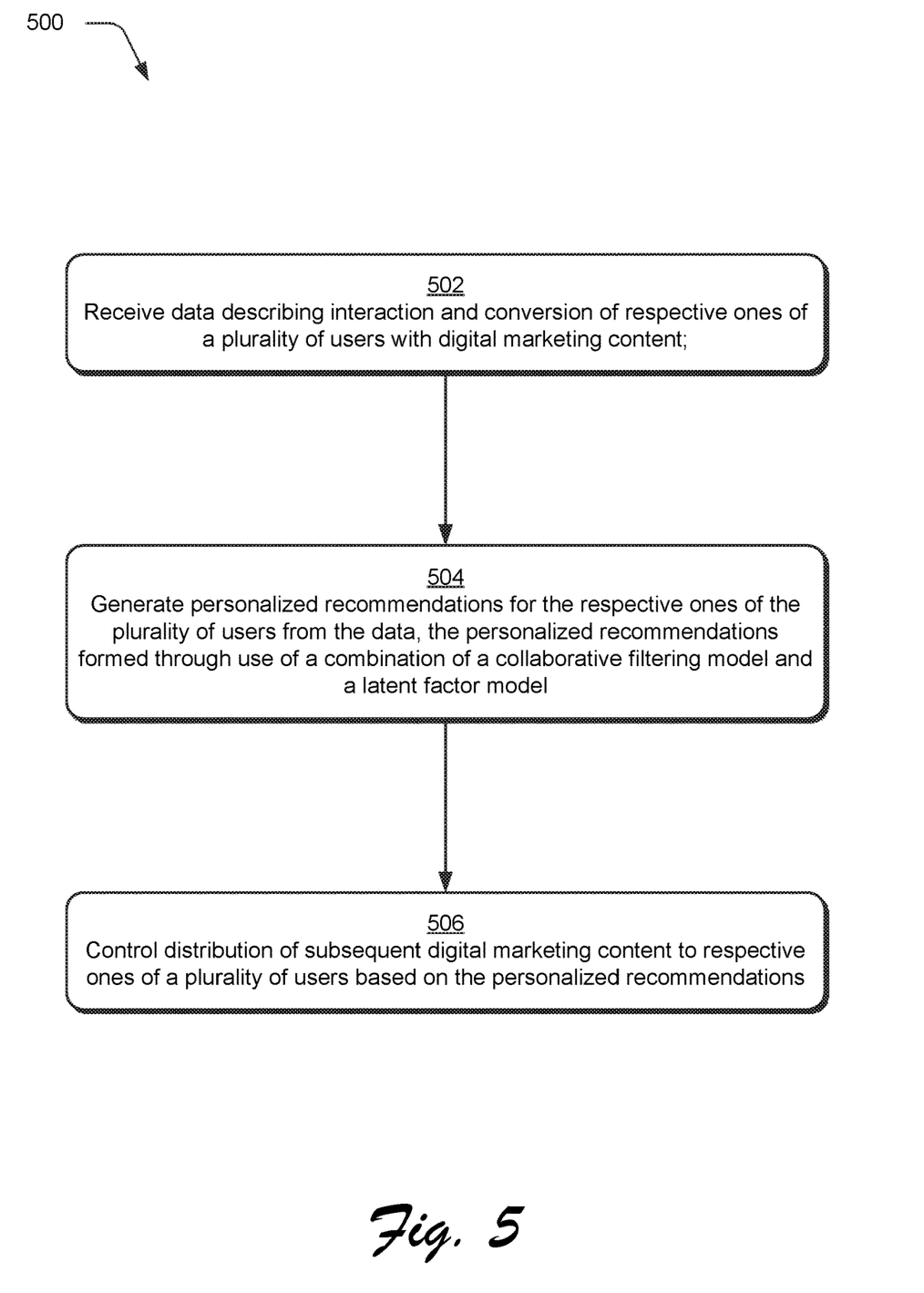
FIG. 5 is a flow diagram depicting a procedure in an example implementation in which distribution of digital marketing content is controlled based on recommendations.

FIG. 5 depicts a procedure 500 in an example implementation in which distribution of digital marketing content is controlled based on recommendations. Data is received that describes interaction and conversion of respective ones of a plurality of users with digital marketing content (block 502), e.g., the marketing data 110 from the source 108 as shown in FIG. 1.

Personalized recommendations are generated for the respective ones of the plurality of users from the data, the personalized recommendations formed through use of a combination of a collaborative filtering model and a latent factor model (block 504). The personalized recommendations are formed as previously described such that users and items of digital content are treated separately. This may include use of separate weights for each combination of users and items of digital content.

Distribution is then controlled of subsequent digital marketing content to respective ones of a plurality of users based on the personalized recommendations (block 506), such as to control which items of digital marketing content 120 to provide based on the greatest likelihood of causing conversion to a respective user.

Example System and Device

Figure 6:
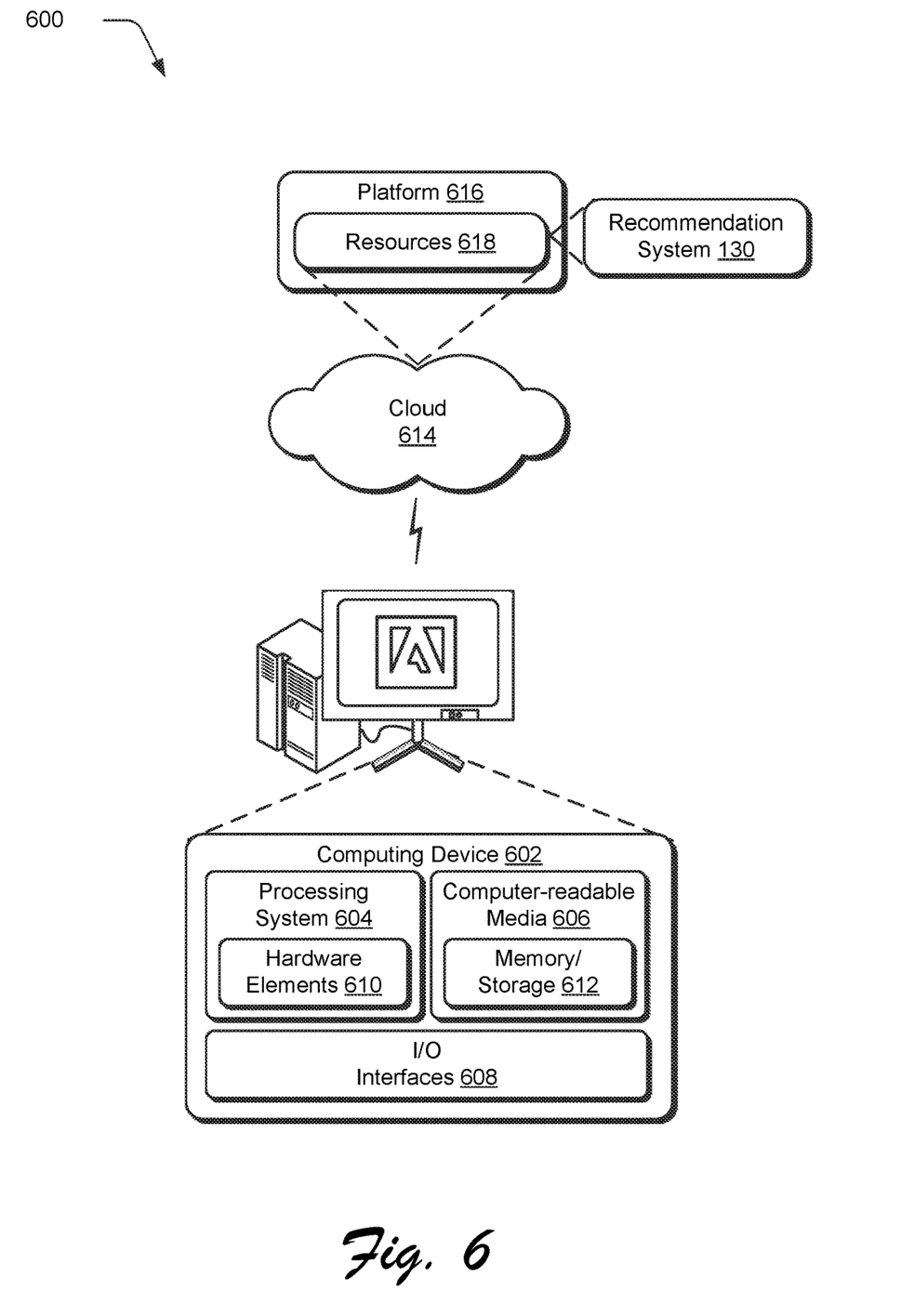
FIG. 6 illustrates an example system including various components of an example device that can be implemented as any type of computing device as described and/or utilize with reference to FIGS. 1-5 to implement embodiments of the techniques described herein.

FIG. 6 illustrates an example system generally at 600 that includes an example computing device 602 that is representative of one or more computing systems and/or devices that may implement the various techniques described herein. This is illustrated through inclusion of the recommendation system 130. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system 600. For example, the functionality may be implemented in part on the computing device 602 as well as via the platform 616 that abstracts the functionality of the cloud 614.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium recommendation environment, a method implemented by a computing device, the method comprising:
   receiving, by a recommendation system of the computing device, data describing interaction of at least one user with digital content;
   generating, by a collaborative filter module of the computing device, a first digital content recommendation for the at least one user by applying a collaborative filtering model to the data based on similarity of the at least one user to at least one other user;
   generating, by a latent factor module of the computing device, a second digital content recommendation for the at least one user by applying a latent factor model to the data, the latent factor model describing the interaction of the at least one user with the digital content based on latent factors that are not directly observed or not directly observable;
   generating, by a recommendation weighting module of the computing device, a third digital content recommendation for the at least one user based on a weighting applied to the first and second digital content recommendations;
   controlling, by the computing device, which subsequent item of digital content of a plurality of items of digital content are to be provided to a computing device of the at least one user based on the third digital content recommendation; and
   sending, by the computing device, the subsequent digital content for receipt by the computing device of the at least one user.

2. The method as described in claim 1, wherein the weighting is specified individually for users and items of the digital content referenced by the collaborative filtering model and the latent factor model.

3. The method as described in claim 1, further comprising determining the weighting by:
   estimating, by the device, an initial recommendation based on a combination of results from the collaborative filtering model and the latent factor model for the at least one user using an initial weighting;
   comparing, by the computing device, the initial recommendation to a training recommendation that is based on a combination of results from the collaborative filtering model and the latent factor model for training data; and
   ascertaining, by the computing device, the weighting based on the comparison.

4. The method as described in claim 3, wherein the ascertaining includes adjusting the initial weighting and repeating the estimating and the comparing using the adjusted initial weighting until convergence of the initial recommendation with the training recommendation, thereby resulting in the weighting used as part of the generating of the third digital content recommendation.

5. The method as described in claim 1, wherein the digital content is digital marketing content and the generating of the first, second, and third recommendations is based at least in part on conversion.

6. The method as described in claim 1, wherein the latent factor model is based at least in part on singular value decomposition.

7. The method as described in claim 1, wherein the collaborative filtering model is configured for:
   regularization of items of digital content separately from regularization of users; or
   the localized regularization in which each single said user and also each single said item of the digital content is modeled separately.

8. The method as described in claim 1, further comprising generating, by the computing device, a fourth digital content recommendation for the at least one user by applying a baseline model to the data and wherein the generating of the third digital content recommendation is based on the first, second, and fourth recommendations.

9. The method as described in claim 1, wherein the subsequent item of digital content is digital marketing content.

10. In a digital medium recommendation environment, a system comprising:
    means for receiving data describing interaction and conversion of respective ones of a plurality of users with digital marketing content;
    means for generating personalized recommendations for the respective ones of the plurality of users from the data, the generating means including:
       collaborative filtering means based on similarity of the responses of the plurality of users to each other or similarity of the plurality of digital marketing content to each other;
       latent factor modeling means describing the interaction and conversion of the respective ones of the plurality of users with the digital marketing content based on latent factors that are not directly observed or not directly observable; and
       localized regularization means in which each single said user and each single said item of the digital marketing content of the collaborative filtering model or the latent factor model is modeled separately; and means for controlling distribution of subsequent digital marketing content to respective ones of a plurality of users based on the personalized recommendations.

11. The system as described in claim 10, wherein the collaborative filtering means is configured for:
regularization of items of digital marketing content separately from regularization of users; or
the localized regularization in which each single said user and also each single said item of the digital marketing content is modeled separately.

12. The method as described in claim 10, wherein the latent factor means implements regularization of items of digital marketing content separately from regularization of users.

13. The method as described in claim 10, wherein the generating means includes means for determining a weighting of the combination of the collaborative filtering means and the latent factor means individually for the respective ones of the plurality of users.

14. The method as described in claim 13, wherein the determining means includes:
means for estimating an initial recommendation based on a combination of results from the collaborative filtering means and the latent factor means for the at least one user using an initial weighting;
means for comparing the initial recommendation to a training recommendation that is based on a combination of results from the collaborative filtering means and the latent factor means for training data; and
means for ascertaining the weighting based on the comparison.

15. The method as described in claim 14, wherein the ascertaining means includes means for adjusting an initial weighting used and repeating execution of the estimating means and the comparing means using the adjusted initial weighting until convergence of the initial recommendation with the training recommendation, thereby resulting in the weighting used as by the generating means for the third digital content recommendation.

16. In a digital medium environment to control recommendation of digital content, a system comprising:
a recommendation generation module implemented at least partially in hardware of computing device to:
receive data describing interaction of at least one user with digital content;
generate a first digital content recommendation for the at least one user by applying a collaborative filtering model to the data, the collaborative filtering model based on similarity of the responses of the plurality of users to each other or similarity of the plurality of digital marketing content to each other; and
generate a second digital content recommendation for the at least one user by applying a latent factor model to the data, the latent factor model describing the interaction of the at least one user with the digital content based on latent factors that are not directly observed or not directly observable;
a recommendation weighting module implemented at least partially in hardware of the computing device to generate a third digital content recommendation for the at least one user based on a weighting applied to the first and second digital content recommendations, the weighting determined by:
estimating an initial recommendation based on a combination of results from the collaborative filtering model and the latent factor model for the at least one user using an initial weighting;
comparing the initial recommendation to a training recommendation that is based on a combination of results from the collaborative filtering model and the latent factor model for training data; and
ascertaining the weighting based on the comparison; and
a content control module implemented at least partially in hardware of the computing device to control which subsequent item of digital content of a plurality of items of digital content are to be provided to a computing device of the at least one user based on the third digital content recommendation and send the subsequent item of digital content for receipt by the computing device via a network.

17. The system as described in claim 16, wherein the ascertaining includes adjusting the initial weighting and repeating the estimating and the comparing using the adjusted initial weighting until convergence of the initial recommendation with the training recommendation, thereby resulting in the weighting used as part of the generating of the third digital content recommendation.

18. The system as described in claim 16, wherein the digital content is digital marketing content and the generating of the first, second, and third recommendations is based at least in part on conversion.

19. The system as described in claim 16, wherein the collaborative filtering model implements regularization of items of digital content separately from regularization of users and the latent factor model implements regularization of items of digital content separately from regularization of users.

20. The system as described in claim 19, wherein the regularization is localized regularization.

* * * * *

UNITED STATES PATENT AND TRADEMARK OFFICE
CERTIFICATE OF CORRECTION

PATENT NO. : 10,810,616 B2
APPLICATION NO. : 15/239162
DATED : October 20, 2020
INVENTOR(S) : Kourosh Modarresi Page 1 of 1

It is certified that error appears in the above-identified patent and that said Letters Patent is hereby corrected as shown below:

In the Claims

Column 21, Line 46, Claim 16 after "in hardware of", insert -- at least one --, therefor.

Column 22, Line 10, Claim 16 after "in hardware of the", insert -- at least one --, therefor.

Column 22, Line 26, Claim 16 after "in hardware of the", insert -- at least one --, therefor.

Signed and Sealed this
Fifth Day of January, 2021

Andrei Iancu
*Director of the United States Patent and Trademark Office*